(12) United States Patent
Marr (10) Patent No.: US 7,622,600 B1
(45) Date of Patent: Nov. 24, 2009

(54) SYSTEM AND METHOD FOR THE CONTINUOUS PRODUCTION OF BIO-DIESEL

(75) Inventor: Wesley Drew Marr, Guymon, OK (US)

(73) Assignee: Redland Industries, Inc., Clinton, OK (US)

( * ) Notice: Subject to any disclaimer, the term of this patent is extended or adjusted under 35 U.S.C. 154(b) by 558 days.

(21) Appl. No.: 11/650,261

(22) Filed: Jan. 5, 2007

Related U.S. Application Data (60) Provisional application No. 60/766,272, filed on Jan. 6, 2006.

(51) Int. Cl.
*C11C 3/04* (2006.01)

(52) U.S. Cl. .............. 554/161; 44/308; 44/309; 554/155; 554/156; 554/157; 554/167; 554/168; 554/169; 554/184

(58) Field of Classification Search ........... 44/307–308; 554/155–157, 167–169, 184
See application file for complete search history.

(56) References Cited

U.S. PATENT DOCUMENTS

| | | | | |
|---|---|---|---|---|
| 4,652,406 A | * | 3/1987 | Lepper et al. | 554/167 |
| 4,698,186 A | * | 10/1987 | Jeromin et al. | 554/174 |
| 5,354,878 A | * | 10/1994 | Connemann et al. | 554/167 |
| 5,525,126 A | | 6/1996 | Basu et al. | |
| 5,849,939 A | * | 12/1998 | Mittelbach et al. | 554/169 |
| 6,015,440 A | | 1/2000 | Noureddini | |
| 6,440,057 B1 | | 8/2002 | Ergün et al. | |
| 6,642,399 B2 | | 11/2003 | Boocock | |
| 6,712,867 B1 | | 3/2004 | Boocock | |
| 6,878,837 B2 | | 4/2005 | Bourney et al. | |
| 6,884,900 B2 | | 4/2005 | Maeda et al. | |
| 6,887,283 B1 | | 5/2005 | Ginosar | |
| 6,979,426 B2 | | 12/2005 | Teall et al. | |
| 7,087,771 B2 | | 8/2006 | Luxem et al. | |
| 7,145,026 B2 | | 12/2006 | Fleisher | |
| 7,507,846 B2 | * | 3/2009 | Pelly | 554/170 |
| 2003/0004363 A1 | * | 1/2003 | Koncar et al. | 554/174 |
| 2007/0260079 A1 | * | 11/2007 | Fleisher | 554/174 |

* cited by examiner

*Primary Examiner*—Robert J Hill, Jr.
*Assistant Examiner*—Brian McCaig
(74) *Attorney, Agent, or Firm*—Crowe & Dunlevy (57) ABSTRACT

A continuous biofuel production process includes the steps of introducing a feedstock containing fatty acids and triglycerides into a first reaction vessel, in which alkyl esters are produced through esterification of free fatty acids. The alkyl esters and triglycerides are introduced into a second reaction vessel, in which at least a portion of the triglycerides are converted to alkyl esters and glycerin through transesterification. The alkyl esters, glycerin, and remaining triglycerides are introduced into a third reaction vessel, in which at least a portion of the remaining triglycerides are converted to alkyl esters and glycerin through transesterification.

21 Claims, 7 Drawing Sheets

SYSTEM AND METHOD FOR THE CONTINUOUS PRODUCTION OF BIO-DIESEL

RELATED APPLICATIONS

This application claims the benefit of U.S. Provisional Patent Application No. 60/766,272, filed Jan. 6, 2006, entitled System and Method for the Continuous Production of Bio-Diesel, the disclosure of which is incorporated herein.

FIELD OF THE INVENTION

This invention relates generally to the field of bio-diesel production, and more particularly, but not by way of limitation, to an improved system and method for the production of bio-diesel.

BACKGROUND

Diesel engines have been used for many years in a variety of applications, including automobiles, marine vessels and industrial generators. Diesel engines consume diesel fuel, which tends to have a higher energy density than common gasoline. Common diesel primarily consists of alkyl esters. In the past, the vast majority of diesel has been produced by refining crude oil through limited distillation/fraction procedures.

As an alternative to the petroleum-based production process, diesel can also be produced using alternative sources. The term "bio-diesel" refers to diesel that is produced from renewable sources, such as vegetable oils or animal fats. These feedstocks contain triglycerides which can be processed into alkyl esters suitable for use in diesel engines. Bio-diesel has a number of advantages over petroleum-based diesel, including lower sulfur content and improved lubricity.

Most bio-diesel production processes involve the conversion of the triglycerides into alkyl esters through a transesterification mechanism by exposing the triglycerides to an alcohol reagent (methanol) in the presence of a base catalyst (lye). Through the transesterification process, each triglyceride molecule is broken into three separate methyl ester molecules with glycerin as a by-product. To improve the quality of the bio-diesel, many production techniques include a preliminary "esterification" stage in which free fatty acids in the feedstock are converted to alkyl esters through exposure to an alcohol (e.g., methanol) in the presence of an acid (e.g., sulfuric acid).

In the past, bio-diesel production has been carried out in batch operations in which fixed quantities of reactants are processed in one or more closed reactor vessels. While generally effective at producing limited volumes of bio-diesel, batch processing is too time intensive for large-scale commercial production. As the demand for bio-diesel increases, there is a need for a continuous process capable of accommodating large-volume production. It is to this, and other deficiencies in the prior art, that the present invention is directed.

SUMMARY OF THE INVENTION

In a preferred embodiment, the present invention is a continuous biofuel production process. The preferred process includes a step of introducing a selected feedstock containing fatty acids and triglycerides into a first reaction vessel, in which alkyl esters are produced through the esterification of the free fatty acids. The alkyl esters and triglycerides are then introduced into a second reaction vessel, in which alkyl esters and glycerin are produced through the transesterification of the triglycerides. The alkyl esters and remaining triglyceride are then preferably introduced into a third reaction vessel, in which remaining triglycerides are converted to alkyl esters and glycerin through transesterification. The alkyl esters and glycerin are passed to a first separator, preferably a centrifuge, configured to separate the glycerin from the alkyl esters, which are part of a biofuel mixture. The biofuel mixture is then passed to a fuel wash vessel, and then the washed biofuel mixture is passed to a second separator. The second separator is preferably a centrifuge configured to separate soap slurry from raw biofuel.

DETAILED DESCRIPTION OF THE PREFERRED EMBODIMENT

Figure 1:
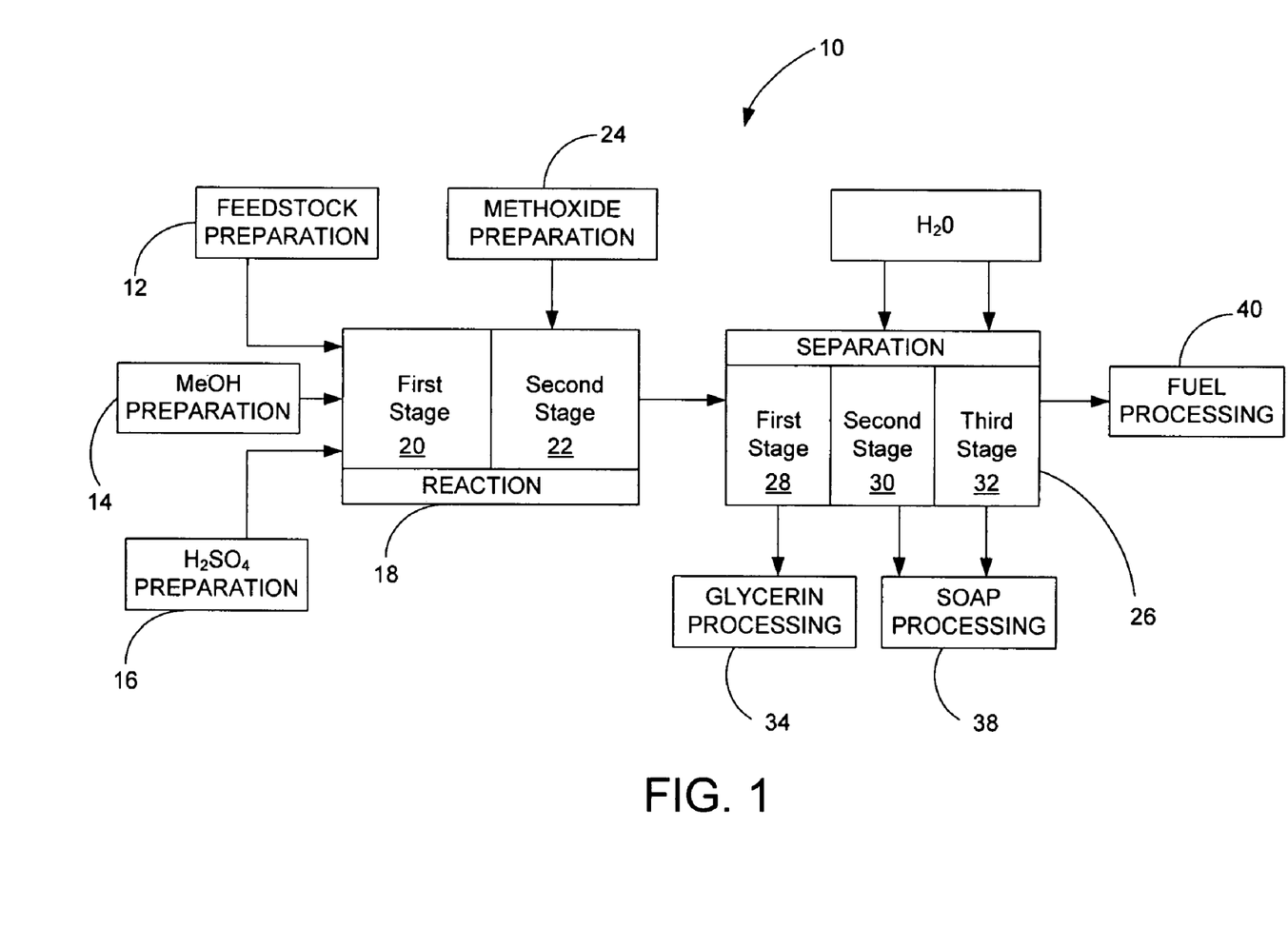
FIG. 1 is a functional flow diagram of a bio-diesel production process executed in accordance with a preferred embodiment of the present invention.

Referring to FIG. 1, shown therein is a functional flow diagram of a presently preferred embodiment of a continuous bio-diesel production process 10. Through the bio-diesel production process 10, one or more selected feedstocks are converted into bio-diesel and by-products on a continuous basis. Although the preferred embodiment is well suited for producing bio-diesel, it will be appreciated that the bio-diesel production process 10 produces alkyl esters that could be used in various applications. The bio-diesel production process 10 could further be used to prepare other byproducts and biofuels. Accordingly, as used herein, the terms bio-diesel and biofuel are used interchangeably unless otherwise specified.

Continuing with FIG. 1, the bio-diesel production process 10 generally includes a feedstock preparation phase 12, a methanol preparation phase 14, a sulfuric acid preparation phase 16, a methoxide preparation phase 24, a reaction phase 18 and a product separation phase 26. The bio-diesel production process 10 also includes a glycerin processing phase 34, a soap processing phase 38 and a fuel processing phase 40. Each of these phases is preferably carried out in a bio-diesel production plant constructed and operated in accordance with the following disclosure.

For the purposes of the present disclosure, each of these phases is sequentially described in accordance with the time-based flow of material through the bio-diesel production process 10. It will be appreciated, however, that unlike prior art methods in which bio-diesel is produced through a series of discrete batch operations, the bio-diesel production process 10 is configured to operate on a continuous basis. Thus, during steady-state operation, each of the phases disclosed herein may occur concurrently with one another.

In the presently preferred embodiment, the feedstock 12 is derived from lard, tallow, or some combination therebetween.

It will be appreciated, that alternative feedstocks, including but not limited to waste vegetable oil or virgin vegetable oil (soybeans, canola, sunflower, safflower, rape, cottonseed, corn, etc.) or other animal fats (cattle, sheep, swine, fish, poultry or butter fat) may be used alone or in combination with the presently preferred feedstocks. In the preferred embodiment, lard and tallow are unloaded from tanker trucks at pump stations and sent to separate storage facilities. From the storage facilities, the lard and tallow are pumped to the reactor vessels. The lard and tallow may be combined with bio-diesel recycled from the fuel processing phase 40.

In the methanol preparation phase 14, methanol is preferably transported to the bio-diesel production plant in a tanker truck and pumped into storage tanks (not shown). From the storage tanks, methanol is pumped to reactor vessels (shown in FIG. 3) and to methoxide preparation equipment (shown in FIG. 2). In the sulfuric acid preparation phase 16, sulfuric acid is preferably shipped to the bio-diesel production plant in a tanker truck and pumped into storage tanks (not shown). From the storage tanks, the sulfuric acid is pumped to the reactor vessels.

Figure 2:
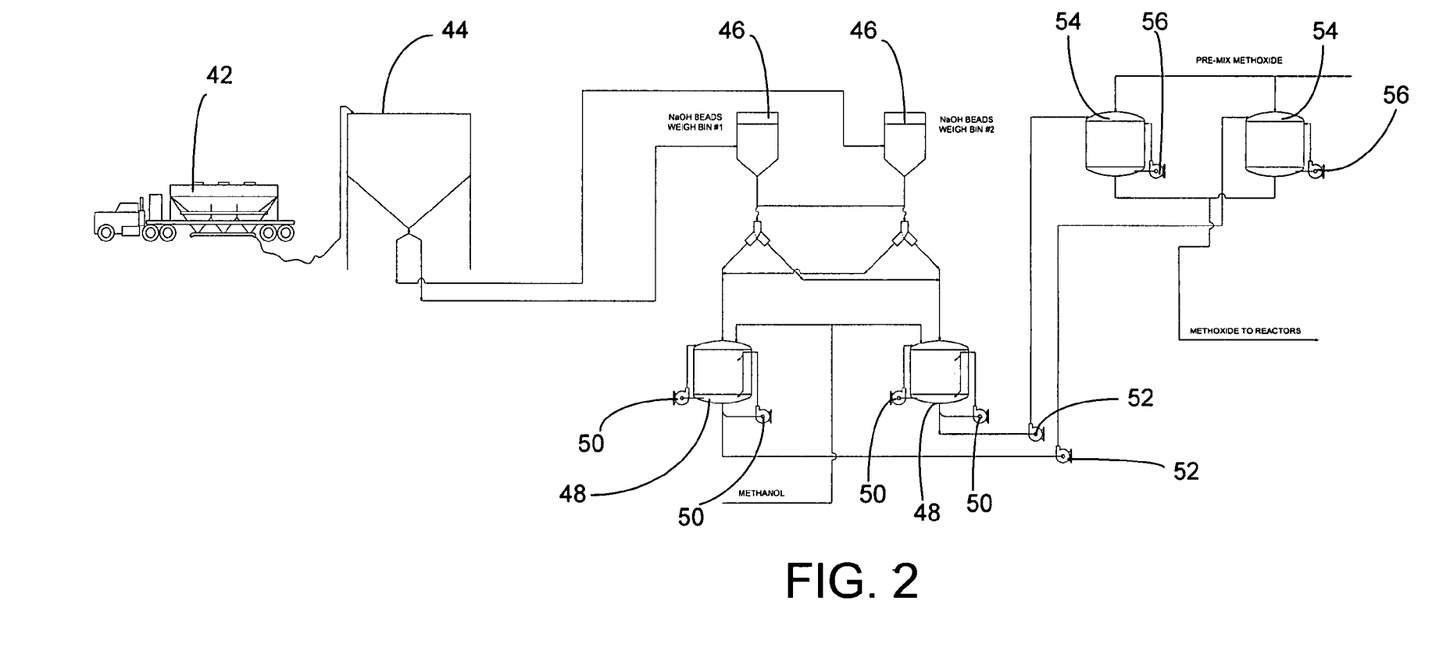
FIG. 2 is a functional flow diagram of the methoxide preparation system of the bio-diesel production process of FIG. 1.

Turning to FIG. 2, shown therein is a methoxide preparation system used to conduct the methoxide preparation phase 24. Sodium hydroxide (NaOH) is preferably shipped to the bio-diesel production process plant in a tanker truck 42 and delivered to a storage bin 44. In the presently preferred embodiment, the sodium hydroxide is shipped in "bead-form" to facilitate handling. The sodium hydroxide is delivered from the storage bin 44 to two separate weighing bins 46 that are configured to accurately dispense selected quantities of sodium hydroxide. Alternatively, the sodium hydroxide may be delivered directly from the tanker truck 42 to the weighing bins 46. The sodium hydroxide is then combined with selected quantities of methanol in mixing tanks 48 that include one or more recirculation pumps 50. The resulting sodium methoxide is pumped via pumps 52 into methoxide storage tanks 54, which also may have recirculation pumps 56. From the storage tanks 54, the sodium methoxide is pumped to the reactor vessels.

The use of methoxide ensures that methanol used during the reaction phase 18 is absolute. Any water present in the methanol tends to react with the methoxide to form caustic soda (NaOH) and methanol. It is important to limit the amount of water present in the reaction phase 18 because water inhibits the transesterification of methanol and triglycerides and promotes unwanted saponification.

Figure 3:
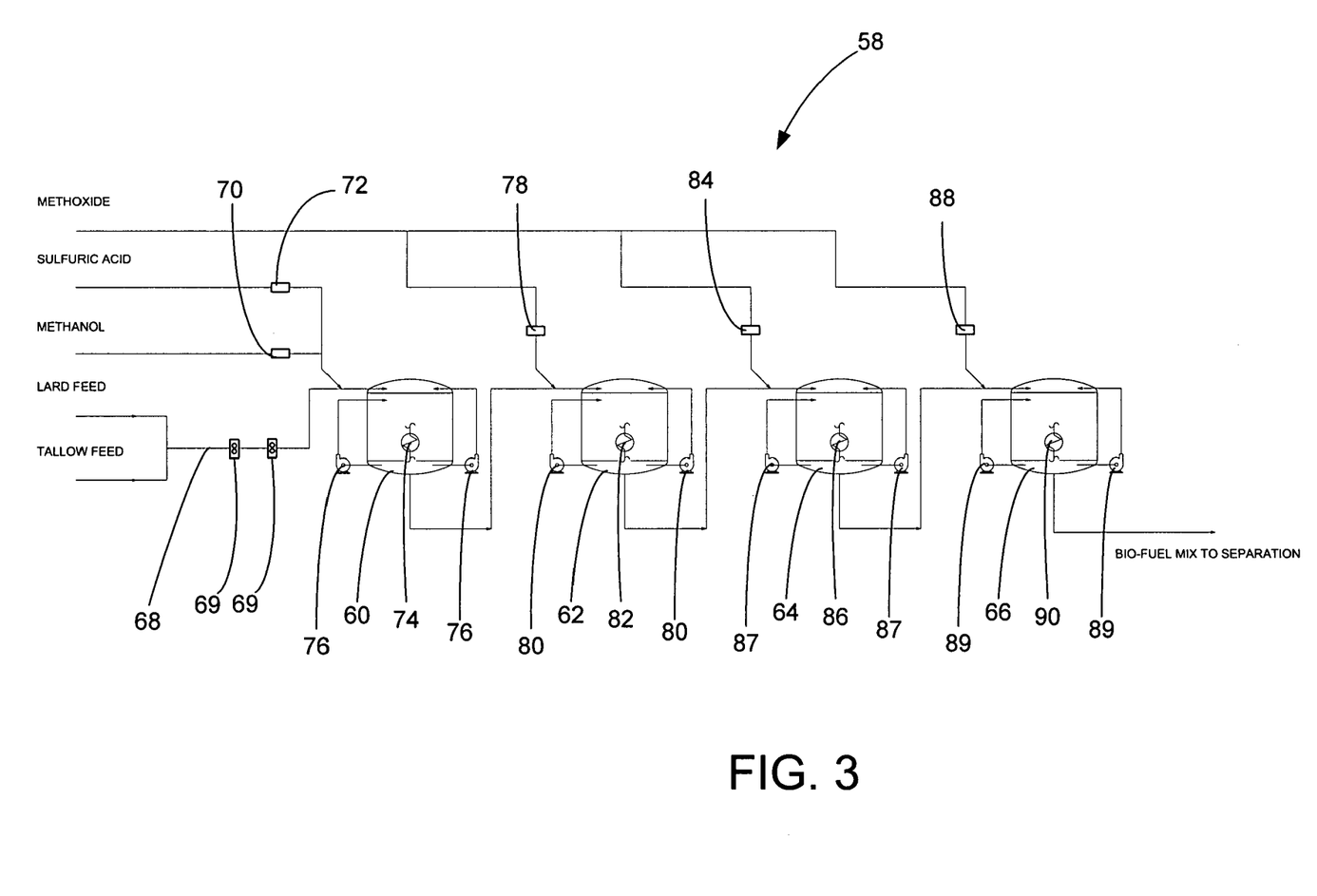
FIG. 3 is a functional flow diagram of the reaction system of the bio-diesel production process of FIG. 1.

Turning now to FIG. 3, shown therein is a reaction system 58 used to conduct the reaction phase 18. The reaction system preferably includes multiple low pressure, temperature controlled reaction vessels, flowmeters, heat exchangers, valves (not numbered), pumps and additional process equipment. In the presently preferred embodiment, the reaction system 58 includes the use of four reaction vessels 60-66. The reaction system is preferably configured for automated control. The use of additional or fewer reaction vessels is also contemplated as within the scope of the preferred embodiment.

The feedstock (lard and/or tallow) is preferably pumped into the reaction system 58 at 60 to 90 gallons per minute. The feed line 68 is preferably equipped with a plurality of flowmeters 69 and a methanol injector 70 to inject methanol at a controlled rate of 5% to 20% of feedstock volume, depending on the feedstock. Although methanol is presently preferred, other alkyl alcohols may be used, including ethanol. The feed line is also equipped with an acid injector 72 proximate to the first reaction vessel. In the presently preferred embodiment, the acid is sulfuric acid and injected at a rate of 0.01% to 0.19% of the volume of feedstock.

The first reaction vessel 60 is preferably equipped with a steam-driven heat exchanger 74 to control the temperature at approximately 100°-130° degrees Fahrenheit, depending on feedstock. Two recirculation pumps 76 are connected to the first reaction vessel 60 to ensure proper mixing of the feedstock, alcohol and acid. The mixture is preferably retained in the first reaction vessel 60 for approximately 30 minutes. The feed line 68 is connected to the top of the first reaction vessel 60. The first stage 20 of the reaction phase 18 occurs within the first reaction vessel 60. During the first stage 20, free fatty acids in the feedstock are converted into alkyl esters through an "esterification" reaction.

The products from the first reaction vessel 60 are discharged from the bottom of the vessel and forced into the top of the second reaction vessel 62. Before the products from the first reaction vessel 60 are introduced into the second reaction vessel 62, a first methoxide injector 78 adds sodium methoxide to the mixture. The sodium methoxide initiates the second stage 22 of the reaction phase 18. The second stage 22 can be characterized as a "transesterification" reaction in which triglycerides in the feedstock are converted into alky esters in the presence of an alcohol and a base catalyst. The second reaction vessel 62 preferably includes two recirculation pumps 80 to ensure complete mixing. The second reaction vessel 62 is also operably connected to a steam-driven heat exchanger 82 that maintains the temperature inside the vessel at approximately 100°-130° degrees Fahrenheit, depending on feedstock. The second reaction vessel 62 is configured to provide a residence time of about 30 minutes.

The product mixture from the second reaction vessel 62 is forced from the bottom of the vessel 62 into the top of a third reaction vessel 64. Before the product mixture from the second reaction vessel 62 is introduced into the third reaction vessel 64, a second methoxide injector 84 adds sodium methoxide to the mixture. The sodium methoxide maintains the transesterification portion of the reaction phase 18. In the presently preferred embodiment, the third reaction vessel 64 is structurally similar, and operated under the same conditions, as the second reaction vessel 62. The temperature inside the third reaction vessel 64 is preferably maintained at approximately 100°-130° degrees Fahrenheit by a steam-driven heat exchanger 86, and the mixture preferably has a residence time of approximately 30 minutes. Furthermore, the third reaction vessel 64 preferably includes two recirculation pumps 87 to ensure complete mixing.

The product mixture of the third reaction vessel 64 is delivered to the top of the fourth reaction vessel 66. A third methoxide injector 88 located in the supply line to the fourth reaction vessel 66 injects a selected quantity of sodium methoxide into the mixture to maintain the transesterification reaction. In the presently preferred embodiment, the fourth reaction vessel 66 is structurally similar, and operated under the same conditions, as the third reaction vessel 64. The temperature inside the fourth reaction vessel 66 is preferably maintained at approximately 100°-130° degrees Fahrenheit, depending on feedstock, with a heat exchanger 90. The fourth reaction vessel 66 preferably includes two recirculation pumps 91, and the mixture preferably has a residence time of approximately 30 minutes.

The product mixture from the fourth reaction vessel 66 is drawn from the bottom of the reaction vessel through a flow control valve 92 (shown in FIG. 4) and sent downstream for the separation and product processing phases of the bio-diesel production process 10. The flow control valve 92 regulates the mixture pressure in each of the four reaction vessels 60-66.

The transesterification reaction produces a "bio-fuel mix" that may include glycerin, alkyl esters (bio-fuel) and soap.

Significantly, unlike prior esterification-transesterification methods in which the reactions are carried out in separate batch operations, the reaction system of the preferred embodiment is capable of conducting the esterification/transesterification process on a continuous flow basis. The repeated injection of sodium methoxide before each of the transesterification reaction vessels is believed to provide an improved yield over single-injection, batch transesterification models. The total quantity of sodium methoxide introduced into the reaction system is calculated as an amount necessary to convert substantially all of the triglycerides to alkyl esters through the continuous flow reaction phase 18.

Figure 4:
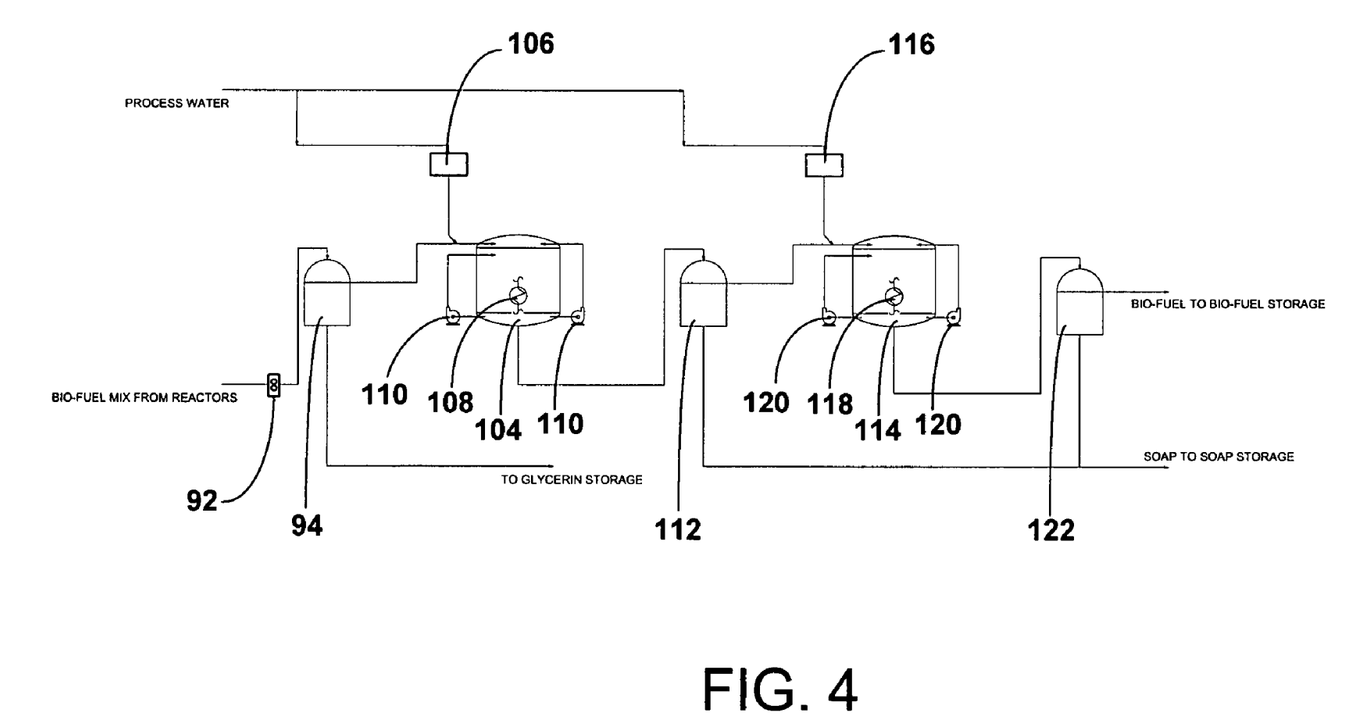
FIG. 4 is a functional flow diagram of the primary separation system of the bio-diesel production process of FIG. 1.

Turning now to FIG. 4, shown therein is a separation system used to conduct the separation phase 26. The separation phase 26 preferably includes three stages. During the first stage 28, glycerin is removed from the bio-fuel mixture. During the second and third stages 30, 32, the bio-fuel mix is "washed" with water and refined to remove any soap created during the transesterification reaction. At the end of the third stage 32, the isolated soap and bio-fuel are sent for downstream separate processing and storage. The separation system preferably includes a plurality of refining separators, pumps, wash vessels and flowmeters. Like the reaction system shown in FIG. 3, the separation system is preferably configured for automated control.

Figure 5:
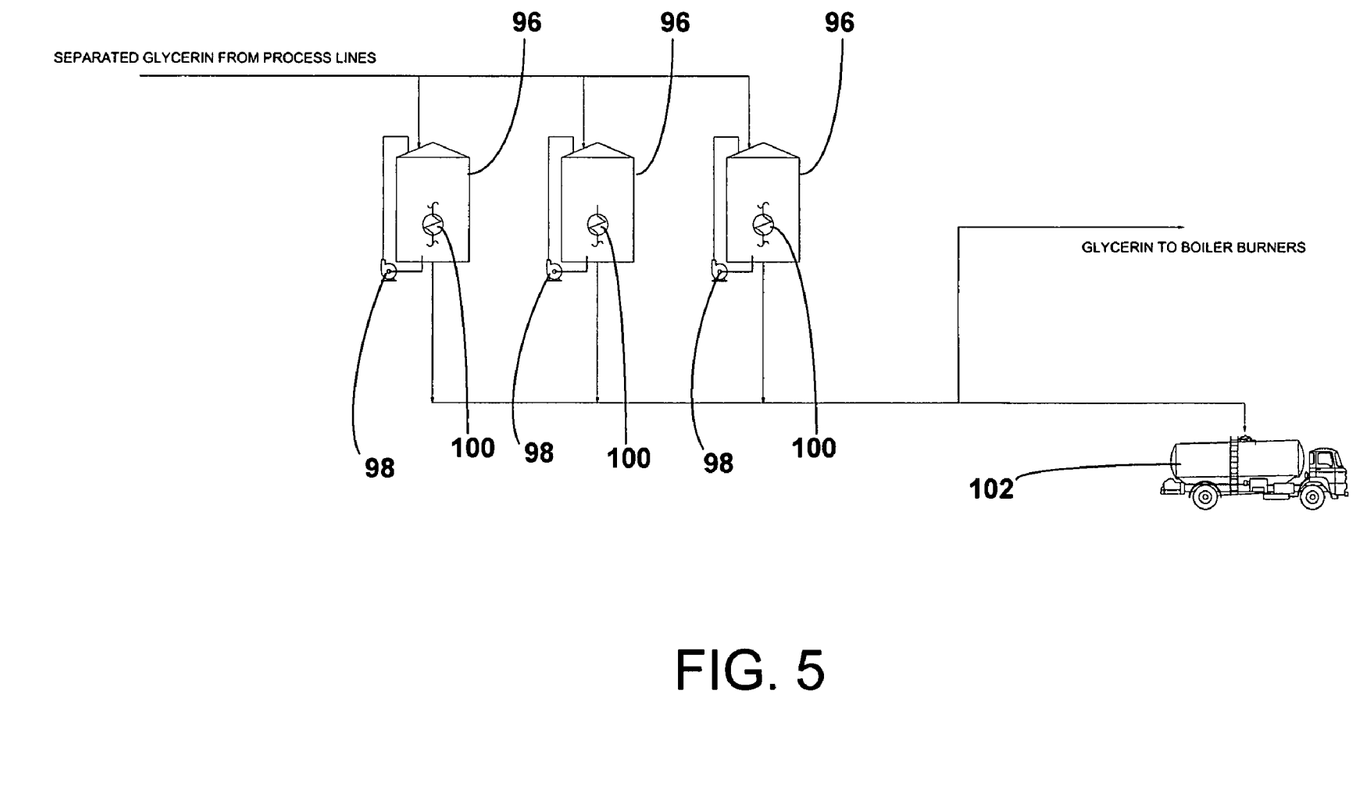
FIG. 5 is a functional flow diagram of the glycerin processing system of the bio-diesel production process of FIG. 1.

From the fourth reaction vessel 66, the bio-fuel mixture enters a first refining separator 94. The first refining separator 94 is preferably configured as a solid bowl-disc centrifuge. Suitable refining separators are available from the Westfalia Separator Company. The first refining separator 94 removes the glycerin component from the remaining bio-fuel mixture. The liberated glycerin is sent downstream for the glycerin processing phase 34 of the bio-diesel production process 10. As shown in FIG. 5, the glycerin is preferably stored in one or more heated tanks 96 that are fitted with recirculation pumps 98 and heat exchangers 100. From the storage tanks, the glycerin can be loaded onto tank trucks 102 for removal from the bio-diesel production plant. Alternatively, the glycerin can be used, independently or in combination with other fuel, to fire the boilers (not shown) inside the bio-diesel production plant.

From the first refining separator 94, the remaining bio-fuel mixture is delivered to the top of a first fuel wash vessel 104. Before entering the first fuel wash vessel 104, a first water injector 106 adds water at a rate of 10% to 30% of the volume of bio-fuel mixture. The temperature inside the first fuel wash vessel 104 is maintained at approximately 100°-130° degrees Fahrenheit, depending on feedstock, by a heat exchanger 108. Two recirculation pumps 110 ensure thorough mixing inside the first fuel wash vessel 104.

From the first fuel wash vessel 104, the washed biofuel mixture, or fuel-soap mixture, is drawn into a second refining separator 112. The second refining separator 112 is preferably the same as the first refining separator 104. Inside the second refining separator 112, the soap slurry is separated from the fuel. The soap slurry is pumped downstream for the soap processing phase 38. The remaining raw fuel is expelled from the second refining separator 112 and preferably conducted to a second fuel wash vessel 114. A second water injector 116 adds water at a ratio of 10%-30% by volume to the raw fuel before it enters the second fuel wash vessel 114. Like the first fuel wash vessel 104, the temperature inside the second fuel wash vessel 114 is maintained at approximately 100°-130° degrees Fahrenheit, depending on feedstock, by a heat exchanger 118. Two recirculation pumps 120 ensure thorough mixing. The mixture circulates for approximately 30 minutes and is drawn to a third refining separator 122.

The third refining separator 122 is preferably the same as the second refining separator 112. Inside the third refining separator 122, soap slurry is separated from the raw fuel. The soap slurry is pumped downstream for the soap processing phase 38. The remaining raw fuel (biofuel or bio-diesel) is expelled from the third refining separator 122 and sent downstream for the fuel processing phase 40.

Figure 6:
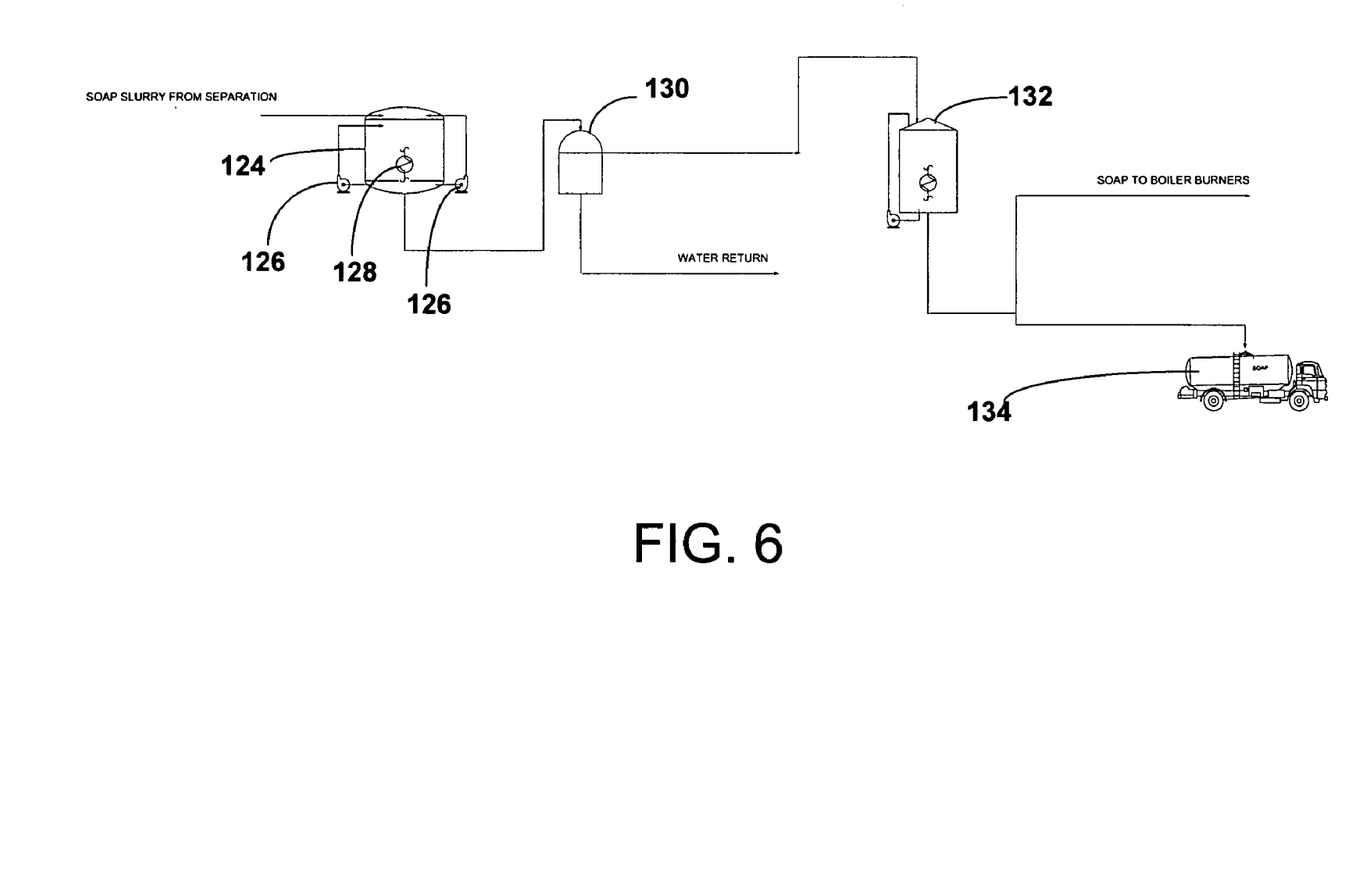
FIG. 6 is a functional flow diagram of the soap processing system of the bio-diesel production process of FIG. 1.

Turning to FIG. 6, shown therein is a diagram of the system used to conduct the soap processing phase 38 of the bio-diesel production process 10. The soap slurry from refining separator 112 and refining separator 122 is pumped into a soap mixing vessel 124 that includes two recirculation pumps 126. The soap mixing vessel 124 may also include a heat exchanger 128. The soap slurry is then drawn from the mixing vessel 124 into a fourth refining separator 130. The fourth refining separator 130 is preferably the same as the first, second and third refining separators. In the fourth refining separator 130, centripetal force separates the soap from water. The extracted soap is pumped to a soap storage tank 132. From the soap storage tank, the soap can be removed from the bio-diesel production plant by truck 134 or delivered to the steam boilers (not shown). The water separated from the slurry is pumped to a non-potable water storage tank (not shown) to be reused in the process.

Figure 7:
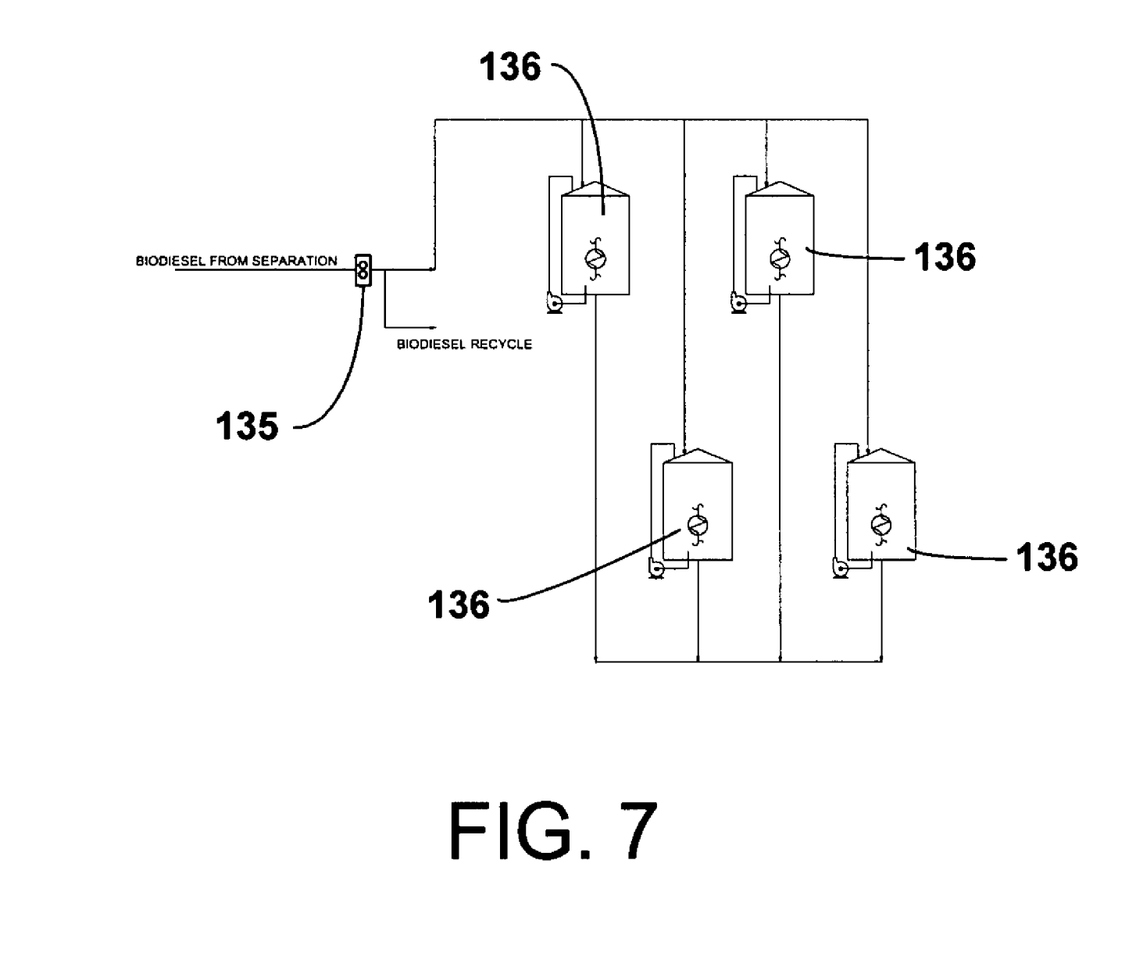
FIG. 7 is a functional flow diagram of the bio-diesel processing system of the bio-diesel production process of FIG. 1.

Turning to FIG. 7, shown therein is a diagram of the system used to conduct the fuel processing phase 40 of the bio-diesel production process 10. The fuel (biofuel or bio-diesel) is pumped through an infrared sensor module 135 to ensure that the fuel meets preset specifications. If the fuel passes the quality control requirements, the fuel is pumped to storage tanks 136. Preferably, storage tanks 136 include recirculation pumps 138 and heat exchangers 140. In the preferred embodiment, the pipeline 142 to the storage tank has an injector 144 incorporated in the line to add a fuel additive with a preservative and stabilizer. If the fuel fails the quality control requirements, the rejected fuel can be optionally recycled to the feedstock preparation system for secondary processing.

In addition to permitting the continuous production of bio-diesel, the preferred embodiment is designed to minimize construction and operations costs. In a particularly preferred embodiment, the first reaction vessel 60, the second reaction vessel 62, the third reaction vessel 64, the fourth reaction vessel 66, the first fuel wash vessel 104, the second fuel wash vessel 114 and the soap mixing vessel 124 are constructed as identical 3000 gallon units.

This is a constant flow design system. The mixture is moving at a rate that is determined by the type of feedstock. The retention time in each vessel is approximately 30 minutes. A series of flow meters, temperature sensors, electric motor frequency controls, pressure regulators and electric current monitors are incorporated in the process and are computer monitored and controlled. It will be appreciated that the bio-diesel production process and associated systems disclosed herein are scaleable and that specific measurements, quantities, ratios, temperatures, or times are provided only for the purpose of enablement.

It is clear that the present invention is well adapted to carry out its objectives and attain the ends and advantages mentioned above as well as those inherent therein. While presently preferred embodiments of the invention have been described in varying detail for purposes of disclosure, it will be understood that numerous changes may be made which will readily suggest themselves to those skilled in the art and which are encompassed within the spirit of the invention disclosed herein, in the associated drawings and the appended claim.

What is claimed is:

1. A continuous biofuel production process comprising the steps of:
   introducing a selected feedstock containing fatty acids and triglycerides into a first reaction vessel, wherein alkyl esters are produced through the esterification of free fatty acids;
   introducing the triglycerides and alkyl esters into a second reaction vessel, wherein at least a portion of the triglycerides are converted to alkyl esters and glycerin through transesterification;
   introducing the alkyl esters, glycerin, and remaining triglycerides into a third reaction vessel, wherein at least a portion of the remaining triglycerides are converted to alkyl esters and glycerin through transesterification;
   passing the alkyl esters and glycerin to a first separator, wherein the first separator is configured to separate the glycerin from the alkyl esters, and wherein the alkyl esters are part of a biofuel mixture;
   passing the biofuel mixture to a fuel wash vessel, wherein the biofuel mixture is washed, and wherein the washed biofuel mixture comprises soap slurry and raw biofuel; and
   passing the washed biofuel mixture to a second separator, wherein the second separator is configured to separate the soap slurry from the raw biofuel.

2. The biofuel production process of claim 1, wherein the feedstock is introduced to the first reaction vessel through a feedline equipped with an acid injector and an injector for an alkyl alcohol.

3. The biofuel production process of claim 1, wherein the feedstock is introduced to the first reaction vessel through a feedline equipped with a flow meter.

4. The biofuel production process of claim 1, wherein sodium methoxide is added to the triglycerides and alkyl esters prior to the introduction of the triglycerides and alkyl esters into the second reaction vessel.

5. The biofuel production process of claim 4, wherein the sodium methoxide is produced from a combination of sodium hydroxide and methanol mixed in a mixing tank prior to addition of the sodium methoxide to the first product.

6. The biofuel production process of claim 1, wherein sodium methoxide is added to the alkyl esters, glycerin, and remaining triglycerides prior to the introduction of the alkyl esters, glycerin, and remaining triglycerides into the third reaction vessel.

7. The biofuel production process of claim 1, wherein the first, second and third reaction vessels each include a recirculation pump.

8. The biofuel production process of claim 1, wherein the first, second, and third reaction vessels are maintained at a temperature of about 100°-130° F.

9. The biofuel production process of claim 1, wherein the first and second separators are centrifuges.

10. The biofuel production process of claim 1, further comprising the step of using the separated glycerin as fuel for the biofuel production process.

11. The biofuel production process of claim 1, further comprising the step of adding water to the biofuel mixture prior to passing the biofuel mixture to the fuel wash vessel, wherein the water is added at a rate of 10% to 30% of the volume of the biofuel mixture.

12. The biofuel production process of claim 1, wherein the soap slurry comprises soap and water, and wherein the process further comprises the step of passing the soap slurry to a refining separator to separate soap from water.

13. The biofuel production process of claim 1, further comprising the step of using the separated soap as fuel for the biofuel production process.

14. The biofuel production process of claim 1, wherein the raw biofuel is passed through an infrared sensor module to ensure that the raw biofuel meets preset specifications.

15. An alkyl ester production process in which alkyl esters are produced from feedstock containing free fatty acids and triglycerides, comprising the steps of:
   reacting the feedstock in an esterification reaction vessel, wherein the free fatty acids are esterified into alkyl esters;
   sequentially passing the alkyl esters and triglycerides through a plurality of transesterification reaction vessels, wherein the plurality of transesterification reaction vessels are configured to accept the alkyl esters and triglycerides in a continuous flow, and wherein transesterification of triglycerides in the plurality of second reaction vessels produces alkyl esters and glycerin;
   separating the alkyl esters from the glycerin in a first separator, wherein the first separator is configured to accept the alkyl esters and glycerin in a continuous flow;
   washing the alkyl esters in a fuel wash vessel, wherein the fuel wash vessel is configured to accept the alkyl esters in a continuous flow, and wherein a soap slurry is produced in the fuel wash vessel; and
   separating the washed alkyl esters from the soap slurry in a second separator, wherein the second separator is configured to accept the alkyl esters and soap slurry in a continuous flow.

16. The alkyl ester production process of claim 15, wherein an acid and an alkyl alcohol are added to the feedstock prior to reacting the feedstock in an esterification reaction vessel.

17. The alkyl ester production process of claim 15, wherein sodium methoxide is added to the alkyl esters and triglycerides prior to passing the alkyl esters and triglycerides into each of the plurality of transesterification reaction vessels.

18. The alkyl ester production process of claim 15, wherein the esterification reaction vessel, the plurality of transesterification reaction vessels, and the fuel wash vessel each include a recirculation pump.

19. The alkyl ester production process of claim 15, wherein the esterification reaction vessel, the plurality of transesterification reaction vessels, and the fuel wash vessel are maintained at a temperature of about 100°-130° F.

20. The alkyl ester production process of claim 15, wherein the first and second separators are centrifuges.

21. A biofuel production process comprising the steps of:
   introducing a selected feedstock comprising triglycerides and free fatty acids into a first reaction vessel, wherein the first reaction vessel is a continuous flow reaction vessel configured and operated to promote the esterification of the free fatty acids to alkyl esters;
   introducing the alkyl esters and triglycerides into a second reaction vessel, wherein the second reaction vessel is a continuous flow reaction vessel configured and operated to promote the transesterification of triglycerides to alkyl esters and glycerin;
   introducing the alkyl esters and triglycerides into a third reaction vessel, wherein the third reaction vessel is a continuous flow reaction vessel configured and operated to promote the transesterification of triglycerides to alkyl esters and glycerin;

passing the alkyl esters and glycerin to a first separator, wherein the separator is a continuous flow separator configured to separate the glycerin from the alkyl esters;

passing the alkyl esters to a fuel wash vessel, wherein the fuel wash vessel is configured as a continuous flow fuel wash vessel; and passing the washed alkyl esters to a second separator, wherein the separator is a continuous flow separator configured to separate soap from the washed alkyl esters.

\* \* \* \* \*